United States Patent [19]
Grebow

[11] 3,744,069
[45] July 10, 1973

[54] WASHER SHAPING TOOL
[76] Inventor: Wolfe Grebow, 8402 Carlson Lane, Baltimore, Md. 21207
[22] Filed: June 23, 1971
[21] Appl. No.: 155,932

[52] U.S. Cl............ 7/4, 51/181, 15/236 R
[51] Int. Cl.......................... B25b 7/22
[58] Field of Search ............ 7/3 R, 4, 5; 51/181, 51/204, 205; 15/104.04, 236 R; 81/3 R

[56] References Cited
UNITED STATES PATENTS

| | | | |
|---|---|---|---|
| 3,486,183 | 12/1969 | Caprioli | 15/104.04 |
| 2,922,218 | 1/1960 | Lewis | 15/236 R |
| 2,696,627 | 12/1954 | Lewis | 15/104.04 |
| 2,405,680 | 8/1946 | Williams | 15/104.04 X |

FOREIGN PATENTS OR APPLICATIONS 1,064,990  12/1953  France........................ 7/4

Primary Examiner—Robert C. Riordon
Assistant Examiner—Roscoe V. Parker
Attorney—John B. Dickman

[57] ABSTRACT

A tool for use when replacing resilient washers on faucets, spigots and the like including a pair of pivotally interconnected members having a screw driver on the free ends thereof for removing and replacing the washer retaining screw and opposed cutting surfaces on the inner surfaces of the members for abrading material from the periphery of the washer when placed therebetween, manually clamped and rotated in relation thereto. A holder is provided for supporting the washer when it is being rotated during the abrading operation.

5 Claims, 5 Drawing Figures

PATENTED JUL 10 1973

3,744,069

INVENTOR.
WOLFE GREBOW
BY John B. Dickman III
AGENT.

WASHER SHAPING TOOL

The present invention generally relates to a manually used tool to facilitate replacement of faucet washers and to reduce the peripheral dimensions of such washers, when necessary, so that they will fit into the recess or socket formed in the inner end of the valve stem.

An object of this invention is to provide a faucet washer replacement tool embodying a pair of elongated legs or handles pivotally connected at one end and provided with a screw driver on each of the free ends to facilitate removal and replacement of the washer retaining screw.

Another object of the invention is to provide a tool in accordance with the preceding object which includes a pair of opposed cutting or abrading devices mounted on the pivotal legs to manually clamp the periphery of a washer therebetween.

A further object of the present invention is to provide a tool which includes a device for holding the washer for relative rotation with respect to the abrading device thereby removing material from the periphery thereof so that it will readily fit into the recess or socket provided therefor on the inner end of the valve stem.

Still another object of this invention is to provide a faucet washer replacement tool which is simple in construction, easy to use, efficient in operation, dependable and long lasting and relatively inexpensive to manufacture.

A further object of this invention is to provide a tool which has several pairs of opposed cutting or abrading devices, at least one of said pairs having arcuate, tapered abrading surfaces.

These and other objects of this invention, as well as the advantages attendant thereto will become readily apparent from the following description and drawings wherein.

Figure 2:
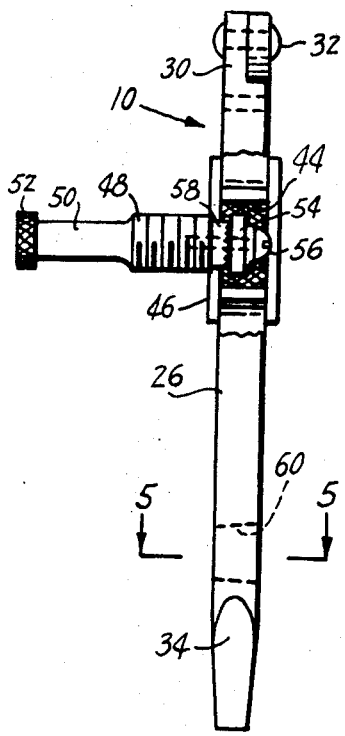
FIG. 2 is a side elevational view of the tool, showing the washer being abraded.
Figure 3:
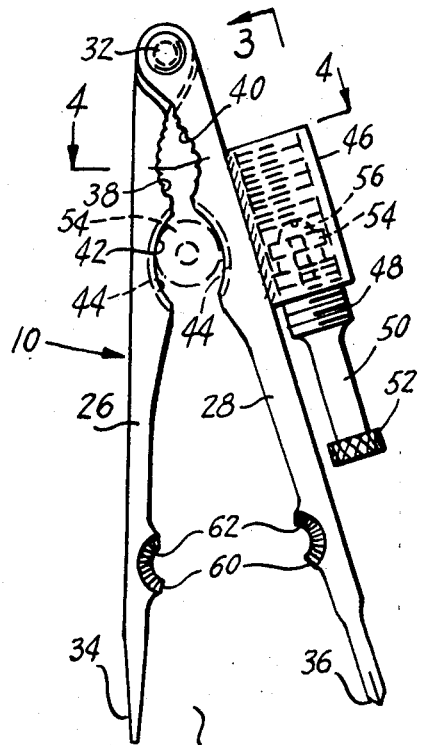
FIG. 3 is a side elevational view taken along reference line 3—3 in FIG. 1 showing the washer holder structure.
Figure 1:
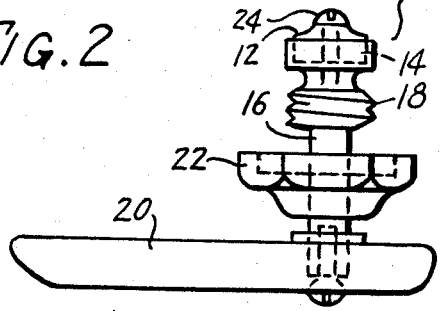
FIG. 1 is a front elevational view of the tool and a faucet valve and handle assembly showing the tool in use to replace a faucet washer.
Figure 5:
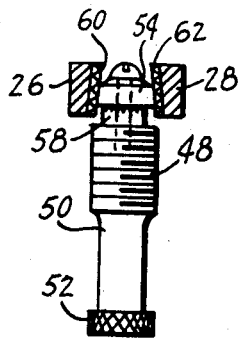
FIG. 5 is a sectional view taken on the line 5—5 of FIG. 2, showing the washer in the arcuate, tapered pair of abrading devices.
Figure 4:
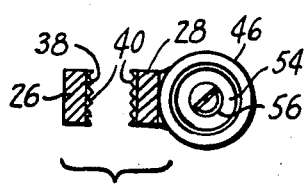
FIG. 4 is a detailed sectional view taken along section line 4—4 on FIG. 1 showing the structure of the cutting device.

Referring now specifically to the drawings, the tool of the present invention is designated generally by reference numeral 10 and is adapted to replace the resilient faucet washer 12 disposed in a recess or socket 14 formed in the inner end of the valve stem 16 which has the usual threads 18 thereon, a manipulating handle 20 on the outer end thereof and an internally threaded cap 22 thereon. The washer 12 is retained in mounted position by a retainer screw 24 in a conventional and well known manner.

The tool 10 includes a pair of elongated members 26 and 28 in the form of rod-like handles or legs which have a pivot lug 30 on one end thereof with the pivot lugs 30 being pivotally interconnected by a pivot pin or rivet 32 which enables manual swinging of the members 26 and 28. The other end of member 26 has a screw driver blade 34 formed thereon for removing and replacing screw 24. The other end of member 28 has a screw driver shank 36 thereon shaped to fit a Phillips headed screw in the event such a screw is used in lieu of screw 24.

Each of members 26 and 28 have a concave recess 38 on the inner surface thereof adjacent the pivot pin 32 and each recess 38 is provided with a plurality of serrating teeth 40 formed therein which will serve to remove material from the exterior peripheral surface of the washer 12 when clamped therebetween and rotated. Adjacent recesses 38, another pair of concave recesses 42 are provided which have a coating of abrasive material 44 secured thereto to also abrade material from the periphery of the washer 12 and leave a smooth external surface on the washer for reception in the socket 14.

Mounted on the exterior of the member 28 is a tubular sleeve 46 which is internally threaded and fixed to member 28 by welding or the like. An externally threaded holder rod 48 is screw threaded into the sleeve 46 and includes a stem 50 having knurled head 52 on one end thereof and a washer 54 and retaining screw 56 mounted on the other end with the periphery of the washer extending beyond the adjacent portion of the stem to enable the periphery thereof to be engaged by the cutting teeth 40 or the abrading material 42 when the stem 50 is disposed in perpendicular relation thereto and the head engaged by a suitable tool or placed in a vise or the like. Another pair of concave tapered recesses 60 having abrasive material 62 thereon are located on members 26 and 28. These are for imparting a taper to washers of a different type.

In use, when the old washer has been removed and the new washer is slightly too big to go into the socket, which is frequently the case, the new washer is mounted on the holder 48 and then oriented between teeth 40 and rotated in relation thereto. This operation may be repeated by using the finer abrasive surfaces 44 to give a smooth finish thus providing a washer which will be easily received in the socket after which the retaining screw is replaced. Teeth 58 on the end of the threader rod 48 hold the washer 54 from rotating on the rod 48.

While there has been illustrated and described what is considered to be a preferred embodiment of the invention, it will be appreciated that numerous changes and modifications are likely to occur to those skilled in the art, and it is intended in the appended claims to cover all those changes and modifications which fall within the true spirit and scope of the present invention.

I claim:

1. A tool for reducing the peripheral dimension of a faucet washer comprising a pair of elongated members pivotally connected at one end, said members including means on the opposed surfaces thereof for abrading the periphery of a faucet washer when clamped therebetween and rotated, a holder for the washer when abrading material therefrom, and means on one of said members for removably supporting said holder, said holder including a stem having gripping means thereon, means on the other end of the stem for mounting a washer with a periphery thereof exposed.

2. The structure as defined in claim 1 wherein said supporting means includes an internally threaded sleeve fixed to one of said members, said stem including an externally threaded portion threadedly engaged with the sleeve.

3. The structure as defined in claim 2 wherein said abrading means includes a pair of opposed concave recesses having serrating teeth formed therein.

4. The structure as defined in claim 2 wherein said abrading means includes a pair of opposed concave recesses having abrasive material mounted thereon.

5. The structure as defined in claim 2 wherein a screw driver is formed on the end of at least one of said members for removing and replacing a washer retaining screw.

* * * * *